United States Patent [19]

Sisson et al.

[11] 3,859,216
[45] Jan. 7, 1975

[54] FILTER ASSEMBLY

[75] Inventors: Ronald L. Sisson, Jackson; Donald E. Holmes, Clark Lake; Burton S. Zeller, Parma, all of Mich.

[73] Assignee: Clark Equipment Company, Buchanan, Mich.

[22] Filed: Dec. 3, 1973

[21] Appl. No.: 421,205

[52] U.S. Cl. .......... 210/440, 210/443, 210/452, 210/DIG. 17
[51] Int. Cl. ........................................ B01d 27/00
[58] Field of Search .......... 210/437, 440, 443, 452, 210/DIG. 17

[56] References Cited
UNITED STATES PATENTS

| | | | |
|---|---|---|---|
| 2,758,719 | 8/1956 | Line | 210/DIG. 17 |
| 2,937,756 | 5/1960 | Humbert, Jr. | 210/DIG. 17 |
| 2,979,208 | 4/1961 | Humbert, Jr. | 210/DIG. 17 |
| 3,217,942 | 11/1965 | Humbert, Jr. et al. | 210/DIG. 17 |

Primary Examiner—Samih N. Zaharna
Assistant Examiner—Richard W. Burks
Attorney, Agent, or Firm—Ernst H. Ruf

[57] ABSTRACT

An improved screw-on throwaway-type fluid filter assembly adapted to be screwed onto a filter mounting means having fluid flow passages therein that extend to and from the filter bowl interior, with the improved filter assembly, which is capable of withstanding surge pressures up to about 500 P.S.I., including a base plate of uniform cross section, with but a single concentric opening through which both fluid passages extend, and sealing means coaxial with and closely radially disposed to the concentric opening, thereby minimizing base plate deflection to reduce both fluid leakage and filter bowl fatigue failure.

11 Claims, 3 Drawing Figures

PATENTED JAN 7 1975　　　　　　　　　　3,859,216

3,859,216

FILTER ASSEMBLY

BACKGROUND OF THE INVENTION

1. Field of the Invention

The field of art to which this invention pertains includes that of liquid purification or separation; more specifically, an improved screw-on throwaway-type fluid filter assembly having an inlet and outlet at the same end and adapted to be screwed onto a filter mounting means.

2. Description of the Prior Art

With the present high labor costs, the trend in fluid filters has steadily been toward the screw-on throwaway-type that may readily be attached to or removed from the item whose fluid requires filtration. A good example of this trend is in the automotive field wherein screw-on throwaway-type fluid filter assemblies are almost universally used. Filter assemblies of this type are also being used on transmissions and torque converters that are utilized in heavy duty industrial and construction equipment. However, the service requirements for these applications are much more severe than those encountered in the general automotive field. For example, in general automotive type applications, fluid pressures rarely, if ever, exceed 100 P.S.I., whereas, in industrial applications, surge pressures approaching 500 P.S.I. are not uncommon.

The prior art spin-on type fluid filters that are used in the automotive area generally utilize a filter unit base plate which, in addition to a central aperture, also has a series of additional, preferably equally spaced, holes that surround the central aperture, with these holes serving as inlet ports for the fluid to be filtered; whereas, the central aperture serves as an outlet port. An example of this type of construction is shown in U.S. Pat. No. 3,204,771 to Baldwin. The sealing of these prior art filter assemblies against a filter head or mounting plate is accomplished by an elastomeric ring shaped gasket that is retained in a sheet metal groove located intermediate the ends of an annular shaped cover plate that is secured to the base plate. These prior art spin-on filters (having base plates with central aperture outlets and peripheral aperture inlets) are very satisfactory in normal automotive type applications but unsatisfactory in high pressure industrial type applications due to excessive base plate deflection. Excessive base plate deflection not only causes the gaskets to extrude out of their retaining grooves and consequently permit fluid leakage, but also causes excessive filter bowl seam deflection and subsequent filter bowl fatigue failure.

SUMMARY OF THE INVENTION

The improved filter assembly of this invention, which is adapted to be screwed onto a filter mounting head having fluid flow passages therein, solves the previously mentioned problems by utilizing a structure that includes a generally U-shaped filter bowl that is open at one end and has an annular filter element operatively mounted in the bowl in the normal path of fluid flow between these passages. A rigid cicular base plate of uniform cross section is used for closing off the open end of the filter bowl, with the base plate having but a single, central threaded opening for attaching the filter assembly onto the filter head. A cover plate, which is secured to the outer surface of the base plate and seamed to the edge of the filter bowl open end, is provided with an outwardly opening groove portion closely radially adjacent to the base plate central opening so as to minimize any moment arm therebetween. A sealing means axially extends from the cover plate groove portion and is adapted to permit sealing communication between the filter assembly and the filter mounting head. The rigid base plate, by having but one central opening therein, and the closely adjacent sealing means (which minimizes any moment arm therebetween), combine to minimize deflection and subsequent fluid leakage between the filter assembly and the filter mounting head. This structure further minimizes the incidents of fatigue failure at the seam between the cover plate and the filter bowl edge. The improved fluid filter assembly of this invention is capable of filtering fluids having surge pressure up to about 500 P.S.I..

The improved screw-on throwaway-type fluid filter assembly of this invention is preferably combined with a filter mounting means in the form of a filter head that has fluid inlet and fluid outflow passages provided therein. One of these passages terminates at its relatively inner end in a first passage portion which opens and extends into the bowl interior and into sealing relationship relative to the inner surface of the annular filter element. The other passage terminates at its relatively inner end in a second passage portion which also opens into the bowl interior but is disposed radially outwardly from the bowl axis. The second passage portion includes an annular externally threaded portion that is coaxial with the first passage portion, with the threaded portion extending into the bowl interior for a predetermined distance so as to permit communication between the other passage and the outer surface of the annular filter element. An annular sealing surface radially outwardly from the threaded second passage portion permits sealing communication between the filter assembly and the filter head.

Other features and advantages of the invention will become more readily understood by persons skilled in the art when following the detailed description in conjunction with the several drawings.

DESCRIPTION OF THE PREFERRED EMBODIMENT

Figure 2:
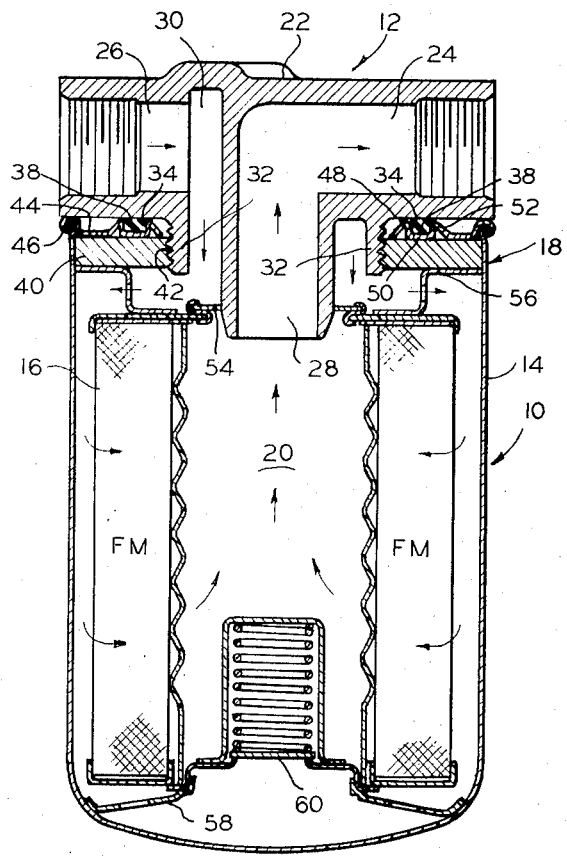
FIG. 2 is a sectional side elevation, taken along line 2—2 of FIG. 1 of the filter head and the improved filter assembly of this invention.

Referring now to the drawings in detail, particularly FIG. 2, there is shown a screw-on throwaway-type fluid filter assembly 10 that is adapted to be screwed onto a filter mounting means 12. Filter assembly 10 includes a filter shell or bowl 14 of inverted, U-shaped configuration fashioned from sheet metal, a unitary annular filter element or cartridge 16, of any well known construction that is operatively mounted within bowl 14, and a base structure 18 for closing the normally open end of bowl 14.

Filter mounting means 12 preferably takes the form of a filter head 22 that is formed with fluid-flow passages 24 and 26 through which the fluid to be filtered is flowed into and from filter bowl 14. Fluid flow passage 24 terminates at its relatively inner end in a first generally cylindrical passage portion 28 that is concentric with the bowl longitudinal axis and which opens and extends into the interior 20 of bowl 14. First passage portion 28 also extends into and comes into a sealing relationship relative to the cylindrical inner surface of annular filter element 16 in any well known manner. It should be noted at this time that the filter element 16, its filtering media FM, and the particular filter element retaining structure within bowl 14 form no part of the present invention.

Figure 1:
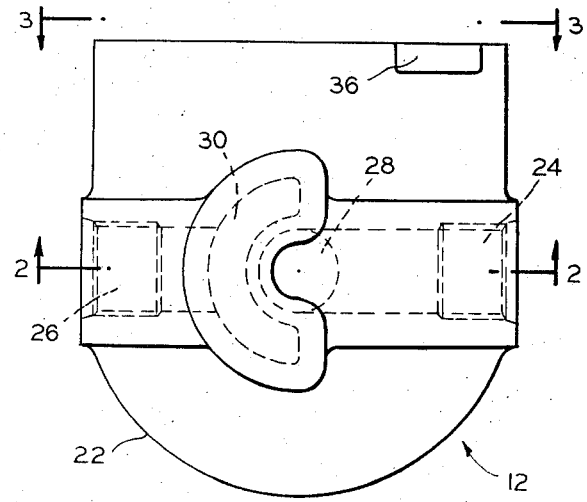
FIG. 1 is a top view of the filter head used with the improved filter assembly of this invention.

Fluid flow passage 26 terminates at its relatively inner end in an arcuate or semicircular second passage portion 30, as best seen in FIGS. 1 and 2. Second passage portion 30 also opens into bowl interior 20 but is disposed radially outwardly from the bowl longitudinal axis. Second passage portion 30 also includes an annular externally threaded portion 32 that is coaxial with first passage portion 29, with threaded portion 32 extending into the bowl interior for a predetermined distance so as to permit communicaton between passage 26 and the outer surface of annular filter element 16.

At this time, it should be clear that filter element 16 is mounted in the normal path of fluid flow between passages 24 and 26, i.e., for example, fluid entering through fluid flow passage 26 flows via passage portions 30 and 32 into bowl 14, around the outer surface of filter element 16, radially through filtering media FM into the hollow center portion of the filter element and then exits therefrom via passage portion 28 and fluid flow passage 24. It should, of course, be understood that, if so desired, the fluid flow direction could just as well be reversed, i.e., the fluid entering through fluid flow passage 24 and exiting through fluid flow passage 26.

Figure 3:
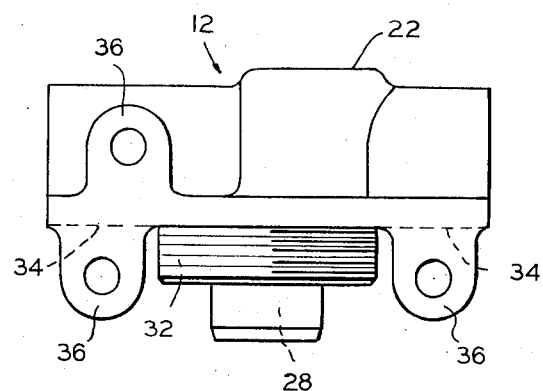
FIG. 3 is an end view of the filter head of this invention, looking in the direction of arrows 3—3 of FIG. 1, showing details of the mounting means thereof.

Filter head 22 also includes annular plane sealing surface 34 that is located radially outwardly from threaded passage portion 32, with sealing surface 34 mating with resilient gasket sealing means 38, which will be discussed in more detail later. As best seen in FIGS. 1 and 3, filter head 22 is provided with multiples of attachment lugs 36 for securing the filter head to any desired base structure, such as, for example, an engine or transmission or wherever fluid filtering is desired.

Now further describing fluid filter assembly 10, base structure 18 includes as its principal structural element, a rigid circular disc-formed base plate 40 of heavy gauge steel which is formed in its central portion with an internally threaded opening 42 for screwing filter assembly 10 onto filter head threaded portion 32. Filter assembly base structure 18 also includes a filter-base cover plate 44 of relatively thin metal that is attached, preferably by spot welding, to base plate 40. Cover plate 44 is formed along its outer periphery with a depending flange which is double-lock-seamed, as at 46, to the bottom edge of filter bowl 14. In addition, cover plate 44 is of generally annular form and terminates along its inner edge very close to base plate central opening 42 and is also provided with two circular, radially spaced, outwardly-projecting ribs 48 and 52 which therebetween define an annular groove 50. Groove 50, which is disposed very close to base plate central opening 42, serves as a retainer for resilient gasket sealing means 38 which has an axial dimension greater than the axial depth of ribs 48 and 50 so as to permit compression and subsequent sealing communication between the filter assembly and the filter head sealing surface when the former is screwed onto filter head 22. Resilient gasket sealing means 38 may be of any conventional configuration. The proximity of sealing means 38 to opening 42 minimizes the moment arm therebetween, thus reducing both deflection and fluid leakage.

As previously noted, filter element 16 and its mounting structure may be of any well known configuration and preferably include a conventional type of sealing means 54 that permits a sealing relationship between first fluid passage portion 28 and the inner cylindrical surface of annular filter element 16. Further structural filter elements preferably include filter locating brackets 56 and 58 as well as a conventional filter bypass or relief valve 60, preferably of a two-way type, which is incorporated into the filter element and so constructed and arranged as to permit fluid to flow in either direction through the filter element (depending on the direction of fluid flow) in the event that filter element 16 becomes obstructed. In the interest of simplicity, and since the relief valve forms no part of the invention per se, only a simple one-way relief valve is shown in the drawings. In addition, if desired, in lieu of adding bypass valve 60 to the filter element, it could also readily be incorporated into the filter mounting means in a manner well known in the art.

As previously noted, the prior art utilizes a filter unit base plate which, in addition to the central aperture, also has a series of additional preferably equally spaced holes that surround the central aperture, with these holes serving as inlet ports for the fluid to be filtered; whereas, the central aperture serves as an outlet port. The sealing of the filter assembly against the filter head is accomplished by an elastomeric ring-shaped gasket that is retained in a sheet metal groove located intermediate the ends of the annular shaped cover plate. This design, while being generally very satisfactory with regard to normal automotive type applications, is not satisfactory in higher pressure applications such as used in industrial type transmission or the like. For example, the filter assembly of this invention in one application on an industrial type transmission used in the construction industry must meet the following specifications:

flow—15 G.P.M. at 5 P.S.I. Differential
filtration—55 Micron
temperature—normal 225°F., maximum 250°F., intermittent 300°F.
pressure—250 P.S.I. max.—operating
 450 P.S.I. max.—surge
fluid—type A transmission oil
gasket material—Polyacrylate At these operating pressures, the prior art spin-on filters (having base plates with central aperture outlets and peripheral aperture inlets) are unsatisfactory since, due to excessive base plate deflection, the face-type gasket seals tend to extrude out of their retaining grooves. (It should be noted that in general automotive type applications, pressure rarely, if ever, exceeds 100 P.S.I..)

One operative example of the filter assembly of this invention has the following dimensions (in inches) or ratios:

outside diameter of bowl ~ 3.8125
outside diameter of base plate ~ 3.75
diameter of base plate opening (I.D.) ~ 1.9375
ratio of I.D./O.D. of base plate ~ 0.516
thickness of base plate ~ 0.25 cross-sectional dimension of seal ring ~ 0.1875 × 0.1875 median diameter of seal ring ~ 2.625 ratio of seal ring median diameter to base plate I.D. ~ 1.355

It should also be noted that base plate deflection may be reduced by reducing the size and number of the fluid flow inlet holes in the base plate; however, this substantially reduces the fluid flow rate, this creating another problem.

This invention overcomes both the problem of excessive base plate deflection and inadequate fluid flow by combining a filter mounting means, having a filter head portion of the type wherein both the fluid input and output flows are through the head member, with an improved filter assembly base structure, wherein the filter head portion projects into the fluid filter assembly only through one central aperture in the filter base structure.

In addition to increasing the thickness of the base plate and eliminating the weakening series of peripheral holes, the threaded central opening of the base plate and the gasket sealing means are closely adjacent to each other in order to minimize the moment arm therebetween, thus reducing both base plate deflection and fluid leakage.

Other benefits of this invention are that by minimizing base plate deflection, the incidents of filter bowl deflection and subsequent filter bowl fatigue failure are also reduced.

From the foregoing, it is believed that those familiar with the art will readily recognize and appreciate the novel concepts and features of the present invention. Obviously, while the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. In combination, a screw-on throwaway-type fluid filter assembly having a cylindrical filter bowl open at one end, as well as an annular filter element operatively mounted in the bowl, and a filter mounting means, said filter assembly being adapted to be screwed onto said filter mounting means, said filter mounting means comprising a filter head having:
   a. fluid inlet and fluid outflow passages provided therein;
   b. one said passage terminating at its relatively inner end in a first passage portion which opens and extends into the bowl interior on the bowl axis and into sealing relationship relative to the inner surface of said annular filter element;
   c. the other said passage terminating at its relatively inner end in a second passage portion which also opens into the bowl interior but is disposed radially-outwardly from said bowl axis;
   d. said second said portion including an annular externally threaded portion coaxial with siad first passage portion, which threaded portion extends into the bowl interior for a predetermined distance so as to permit communication between said other passage and the outer surface of said annular filter element;
   e. said filter element being mounted in the normal path of fluid flow between said fluid passages; and
   f. an annular sealing surface radially outwardly from said threaded second passage portion;

said filter assembly further including:
   a. a rigid base plate closing off the open end of said filter bowl;
   b. said base plate having a central threaded opening for screwing said filter assembly onto said filter head threaded second passage portion;
   c. a cover plate secured to the outer surface of said base plate;
   d. said cover plate being provided with circular, radially spaced, outwardly-projecting ribs disposed radially close to said central threaded opening for holding an annular resilient gasket sealing means therebetween;
   e. said sealing means having an axial dimension greater than the axial depth of said ribs so as to permit sealing communication between said filter assembly and said filter head sealing surface.

2. The combination of claim 1 wherein said assembly is capable of filtering fluids having surge pressures up to about 500 P.S.I..

3. The combination of claim 2 wherein the ratio of the median diameter of said sealing means to said base plate central opening is about 1.3.

4. In a screw-on throwaway-type fluid filter assembly having a generally U-shaped filter bowl, an annular base-plate closing off the open end of the bowl and adapted to be screwed onto a filter mounting means having fluid flow passages therein extending to and from the bowl interior, an annular filter element operatively mounted in the bowl in the normal path of the fluid flow between said passages, a cover plate secured to the outer surface of the base plate and having an outwardly opening groove portion, and annular sealing means extending from the cover plate groove portion and sealingly adjoining the filter mounting means, wherein the improvement comprises:
   a. said base plate being of uniform cross section and having but a single opening through which both of said fluid flow passages extend, thereby minimizing base plate deflection; and
   b. said cover plate groove portion being coaxial with and closely radially disposed to said opening to minimize any moment arm between said opening and said sealing means, thereby both minimizing sealing means deflection and subsequent fluid leakage.

5. The improved fluid filter assembly of claim 4 wherein said base plate central opening and said fluid flow passages are concentric.

6. The improved fluid filter assembly of claim 4 wherein said assembly is capable of filtering fluids having surge pressures up to about 500 P.S.I..

7. The improved fluid filter assembly of claim 4 wherein the ratio of said base plate central opening to said base plate outside diameter exceeds 0.50.

8. The improved fluid filter assembly of claim 4 wherein the ratio of said sealing means median diameter to said base plate central opening is about 1.3.

9. A screw-on throwaway-type fluid filter assembly adapted to be screwed onto a filter mounting head having fluid flow passages therein, said filter assembly comprising:
a. a generally U-shaped filter bowl open at one end;
b. an annular filter element operatively mounted in said bowl in the normal path of fluid flow between said passages;
c. a rigid cicular base plate of uniform cross section for closing off the open end of said filter bowl;
d. said base plate having but a single, central, threaded opening for screwing said filter assembly onto said filter head, with the ratio of said base plate opening to said base plate outside diameter being about 0.50;
e. a cover plate secured to the outer surface of said base plate and seamed to the edge of said filter bowl open end;
f. said cover plate being provided with an outwardly opening groove portion closely radially adjacent to said base plate central opening so as to minimize any moment arm therebetween; and
g. sealing means axially extending from said cover plate groove portion and adapted to permit sealing communication between said filter assembly and said filter mounting head, said rigid base plate, by having but one opening therein, together with said closely adjacent sealing means which minimizes any moment arm therebetween, combining to minimize deflections and subsequent fluid leakage between said filter assembly and said filter mounting head, as well as minimizing the incidents of fatigue failure at said seam between said cover plate and the said filter bowl edge.

10. The combination of claim 9 wherein said assembly is capable of filtering fluids having surge pressures up to about 500 P.S.I..

11. The combination of claim 9 wherein the ratio of the median diameter of said sealing means to said base plate central opening is about 1.3.

* * * * *